United States Patent
Hormati et al.

(10) Patent No.: US 10,193,716 B2
(45) Date of Patent: Jan. 29, 2019

(54) CLOCK DATA RECOVERY WITH DECISION FEEDBACK EQUALIZATION

(71) Applicant: Kandou Labs, S.A., Lausanne (CH)

(72) Inventors: Ali Hormati, Ecublens Vaud (CH); Richard Simpson, Bedford (GB)

(73) Assignee: KANDOU LABS, S.A., Lausanne (CH)

( * ) Notice: Subject to any disclaimer, the term of this patent is extended or adjusted under 35 U.S.C. 154(b) by 0 days.

(21) Appl. No.: 15/582,545

(22) Filed: Apr. 28, 2017

(65) Prior Publication Data
US 2017/0317859 A1 Nov. 2, 2017

Related U.S. Application Data

(60) Provisional application No. 62/328,716, filed on Apr. 28, 2016.

(51) Int. Cl.
*H04L 7/033* (2006.01)
*H04L 25/03* (2006.01)
*H04L 7/00* (2006.01)

(52) U.S. Cl.
CPC ...... *H04L 25/03949* (2013.01); *H04L 7/0087* (2013.01); *H04L 7/033* (2013.01); *H04L 25/03057* (2013.01); *H04L 7/0025* (2013.01)

(58) Field of Classification Search
CPC ......... H04L 25/03949; H04L 25/03057; H04L 7/0331
USPC ........................................ 375/233, 326, 340
See application file for complete search history.

(56) References Cited

U.S. PATENT DOCUMENTS

| | | |
|---|---|---|
| 5,017,924 A | 5/1991 | Guiberteau |
| 5,510,736 A | 4/1996 | Van de Plassche |
| 5,748,948 A | 5/1998 | Yu |
| 6,307,906 B1 | 10/2001 | Tanji |
| 6,384,758 B1 | 5/2002 | Michalski |
| 6,522,699 B1 | 2/2003 | Anderson |
| 6,690,739 B1 | 2/2004 | Mui |

(Continued)

FOREIGN PATENT DOCUMENTS

| | | |
|---|---|---|
| CN | 1864346 | 11/2006 |
| EP | 1926267 | 5/2008 |
| WO | 2005002162 | 1/2005 |

OTHER PUBLICATIONS

Giovaneli, et al., "Space-frequency coded OFDM system for multi-wire power line communications", Power Line Communications and Its Applications, 20015 International Symposium on Vancouver, BC, Canada, Apr. 6-8, 2005, Piscataway, NJ, pp. 191-195.

(Continued)

*Primary Examiner* — Chieh M Fan
*Assistant Examiner* — Fitwi Hailegiorgis
(74) *Attorney, Agent, or Firm* — Invention Mine LLC

(57) ABSTRACT

Methods and systems are described for generating two comparator outputs by comparing a received signal to a first threshold and a second threshold according to a sampling clock, the first and second thresholds determined by an estimated amount of inter-symbol interference on a multi-wire bus, selecting one of the two comparator outputs as a data decision, the selection based on at least one prior data decision, and selecting one of the two comparator outputs as a phase-error indication, the phase error indication selected in response to identification of a predetermined data decision pattern.

16 Claims, 7 Drawing Sheets

(56) References Cited

U.S. PATENT DOCUMENTS

| | | |
|---|---|---|
| 6,772,351 B1 | 8/2004 | Werner |
| 6,876,317 B2 | 4/2005 | Sankaran |
| 6,993,311 B2 | 1/2006 | Li |
| 7,176,823 B2 | 2/2007 | Zabroda |
| 7,269,130 B2 | 9/2007 | Pitio |
| 7,366,942 B2 | 4/2008 | Lee |
| 7,613,234 B2 | 11/2009 | Raghavan |
| 7,650,525 B1 | 1/2010 | Chang |
| 7,768,312 B2 | 8/2010 | Hirose |
| 7,860,190 B2 | 12/2010 | Feller |
| 7,873,115 B2 | 1/2011 | Zerbe |
| 8,295,336 B2 | 10/2012 | Lutz |
| 8,305,247 B2 | 11/2012 | Pun |
| 8,791,735 B1 | 7/2014 | Shibasaki |
| 8,841,936 B2 | 9/2014 | Nakamura |
| 9,059,816 B1 | 6/2015 | Simpson |
| 9,300,503 B1 | 3/2016 | Holden |
| 9,461,862 B2 | 10/2016 | Holden |
| 9,479,369 B1 | 10/2016 | Shokrollahi |
| 9,520,883 B2 | 12/2016 | Shibasaki |
| 9,634,797 B2 | 4/2017 | Benammar |
| 9,667,379 B2 | 5/2017 | Cronie |
| 9,917,711 B2 | 3/2018 | Ulrich |
| 2002/0167339 A1 | 11/2002 | Chang |
| 2002/0181607 A1 | 12/2002 | Izumi |
| 2003/0016763 A1 | 1/2003 | Doi |
| 2003/0016770 A1 | 1/2003 | Trans |
| 2003/0046618 A1 | 3/2003 | Collins |
| 2003/0085763 A1 | 5/2003 | Schrodinger |
| 2003/0174023 A1 | 9/2003 | Miyasita |
| 2003/0185310 A1 | 10/2003 | Ketchum |
| 2003/0218558 A1 | 11/2003 | Mulder |
| 2004/0027185 A1 | 2/2004 | Fiedler |
| 2004/0092240 A1 | 5/2004 | Hayashi |
| 2004/0146117 A1 | 7/2004 | Subramaniam |
| 2004/0155802 A1 | 8/2004 | Lamy |
| 2004/0161019 A1 | 8/2004 | Raghavan |
| 2004/0169529 A1 | 9/2004 | Afghahi |
| 2004/0170231 A1 | 9/2004 | Bessios |
| 2005/0024117 A1 | 2/2005 | Kubo |
| 2005/0134380 A1 | 6/2005 | Nairn |
| 2005/0195000 A1 | 9/2005 | Parker |
| 2005/0201491 A1* | 9/2005 | Wei .................. H04L 7/0337 375/326 |
| 2005/0220182 A1 | 10/2005 | Kuwata |
| 2005/0270098 A1 | 12/2005 | Zhang |
| 2006/0036668 A1 | 2/2006 | Jaussi |
| 2006/0097786 A1 | 5/2006 | Su |
| 2006/0103463 A1 | 5/2006 | Lee |
| 2006/0140324 A1 | 6/2006 | Casper |
| 2006/0159005 A1 | 7/2006 | Rawlins |
| 2006/0233291 A1 | 10/2006 | Garlepp |
| 2007/0001713 A1 | 1/2007 | Lin |
| 2007/0001723 A1 | 1/2007 | Lin |
| 2007/0002954 A1 | 1/2007 | Cornelius |
| 2007/0030796 A1 | 2/2007 | Green |
| 2007/0103338 A1 | 5/2007 | Teo |
| 2007/0182487 A1 | 8/2007 | Ozasa |
| 2007/0201491 A1 | 8/2007 | Lee |
| 2007/0204205 A1 | 8/2007 | Niu |
| 2007/0283210 A1 | 12/2007 | Prasad |
| 2008/0012598 A1 | 1/2008 | Mayer |
| 2008/0069198 A1 | 3/2008 | Bhoja |
| 2008/0192621 A1 | 8/2008 | Suehiro |
| 2009/0115523 A1 | 5/2009 | Akizuki |
| 2009/0154604 A1 | 6/2009 | Lee |
| 2009/0195281 A1 | 8/2009 | Tamura |
| 2009/0262876 A1 | 10/2009 | Arima |
| 2009/0316730 A1 | 12/2009 | Feng |
| 2010/0020862 A1 | 1/2010 | Peng |
| 2010/0081451 A1 | 4/2010 | Mueck |
| 2010/0148819 A1 | 6/2010 | Bae |
| 2010/0235673 A1 | 9/2010 | Abbasfar |
| 2010/0271107 A1 | 10/2010 | Tran |
| 2010/0283894 A1 | 11/2010 | Horan |
| 2010/0309964 A1 | 12/2010 | Oh |
| 2011/0028089 A1 | 2/2011 | Komori |
| 2011/0032977 A1 | 2/2011 | Hsiao |
| 2011/0074488 A1 | 3/2011 | Broyde |
| 2011/0103508 A1 | 5/2011 | Mu |
| 2011/0228864 A1 | 9/2011 | Aryanfar |
| 2011/0286497 A1 | 11/2011 | Nervig |
| 2012/0082203 A1 | 4/2012 | Zerbe |
| 2012/0133438 A1 | 5/2012 | Tsuchi |
| 2012/0213299 A1 | 8/2012 | Cronie |
| 2012/0327993 A1 | 12/2012 | Palmer |
| 2013/0010892 A1 | 1/2013 | Cronie |
| 2013/0013870 A1 | 1/2013 | Cronie |
| 2013/0088274 A1 | 4/2013 | Gu |
| 2013/0106513 A1 | 5/2013 | Cyrusian |
| 2013/0114519 A1 | 5/2013 | Gaal |
| 2013/0114663 A1 | 5/2013 | Ding |
| 2013/0129019 A1 | 5/2013 | Sorrells |
| 2013/0147553 A1 | 6/2013 | Iwamoto |
| 2013/0188656 A1 | 7/2013 | Ferraiolo |
| 2013/0202065 A1* | 8/2013 | Chmelar .......... H04L 25/03057 375/340 |
| 2013/0215954 A1 | 8/2013 | Beukema |
| 2013/0259113 A1 | 10/2013 | Kumar |
| 2013/0271194 A1 | 10/2013 | Pellerano |
| 2013/0285720 A1 | 10/2013 | Jibry |
| 2013/0307614 A1 | 11/2013 | Dai |
| 2013/0314142 A1 | 11/2013 | Tamura |
| 2013/0315501 A1 | 11/2013 | Atanassov |
| 2013/0346830 A1 | 12/2013 | Ordentlich |
| 2014/0159769 A1 | 6/2014 | Hong |
| 2014/0177645 A1 | 6/2014 | Cronie |
| 2014/0177696 A1 | 6/2014 | Hwang |
| 2014/0266440 A1 | 9/2014 | Itagaki |
| 2014/0269130 A1 | 9/2014 | Maeng |
| 2014/0286381 A1 | 9/2014 | Shibasaki |
| 2015/0049798 A1 | 2/2015 | Hossein |
| 2015/0070201 A1 | 3/2015 | Dedic |
| 2015/0078495 A1 | 3/2015 | Hossain |
| 2015/0117579 A1 | 4/2015 | Shibasaki |
| 2015/0180642 A1 | 6/2015 | Hsieh |
| 2015/0333940 A1 | 11/2015 | Shokrollahi |
| 2015/0349835 A1 | 12/2015 | Fox |
| 2015/0380087 A1 | 12/2015 | Mittelholzer |
| 2015/0381232 A1 | 12/2015 | Ulrich |
| 2016/0020796 A1 | 1/2016 | Hormati |
| 2016/0020824 A1 | 1/2016 | Ulrich |
| 2016/0036616 A1 | 2/2016 | Holden |
| 2016/0197747 A1 | 7/2016 | Ulrich |
| 2016/0261435 A1* | 9/2016 | Musah ............ H04L 25/03019 |
| 2017/0310456 A1 | 10/2017 | Tajalli |
| 2017/0317449 A1 | 11/2017 | Shokrollahi |
| 2017/0317855 A1 | 11/2017 | Shokrollahi |

OTHER PUBLICATIONS

Shibasaki, et al., "A 56-Gb/s Receiver Front-End with a CTLE and 1-Tap DFE in 20-nm CMOS", IEEE 2014 Symposium on VLSI Circuits Digest of Technical Papers, 2 pgs.

Hidaka, et al., "A 4-Channel 1.25-10.3 Gb/s Backplane Transceiver Macro With35 dB Equalizer and Sign-Based Zero-Forcing Adaptive Control", IEEE Journal of Solid-State Circuits, vol. 44 No. 12, Dec. 2009, pp. 3547-3559.

* cited by examiner

CLOCK DATA RECOVERY WITH DECISION FEEDBACK EQUALIZATION

CROSS REFERENCE TO RELATED APPLICATIONS

This application claims the benefit of U.S. Provisional Application No. 62/328,716, filed Apr. 28, 2016, entitled "CLOCK DATA RECOVERY UTILIZING DECISION FEEDBACK COMPENSATION", reference of which is hereby incorporated in its entirety.

REFERENCES

The following prior applications are herein incorporated by reference in their entirety for all purposes:

U.S. Pat. No. 9,100,232, filed Feb. 2, 2105 as application Ser. No. 14/612,241 and issued Aug. 4, 2015, naming Amin Shokrollahi, Ali Hormati, and Roger Ulrich, entitled "Method and Apparatus for Low Power Chip-to-Chip Communications with Constrained ISI Ratio", hereinafter identified as [Shokrollahi].

U.S. patent application Ser. No. 14/926,958, filed Oct. 29, 2015, naming Richard Simpson, Andrew Stewart, and Ali Hormati, entitled "Clock Data Alignment System for Vector Signaling Code Communications Link", hereinafter identified as [Simpson].

The following additional references to prior art have been cited in this application:

"A 3x9 Gb/s Shared, All-Digital CDR for High-Speed, High-Density I/O", Matthew Loh, Azita Emami-Neyestanak, IEEE Journal of Solid-State Circuits, Vo. 47, No. 3, March 2012, hereinafter identified as [Loh].

BACKGROUND

It is common for communications receivers to extract a receive clock signal from the received data stream. Some communications protocols facilitate such Clock Data Recovery or CDR operation by constraining the communications signaling so as to distinguish between clock-related and data-related signal components. Similarly, some communications receivers process the received signals beyond the minimum necessary to detect data, so as to provide the additional information to facilitate clock recovery. As one example, a so-called double-baud-rate receive sampler may measure received signal levels at twice the expected data reception rate, to allow independent detection of the received signal level corresponding to the data component, and the chronologically offset received signal transition related to the signal clock component.

However, the introduction of extraneous communications protocol transitions is known to limit achievable data communication rate. Similarly, receive sampling at higher than transmitted data rate is known to substantially increase receiver power utilization.

Data-dependent receive equalization is also well known in the art. Generally, these time-domain-oriented equalization methods focus on compensating for the effects of inter-symbol-interference or ISI on the received signal. Such ISI is caused by the residual electrical effects of a previously transmitted signal persisting in the communications transmission medium, so as to affect the amplitude or timing of the current symbol interval. As one example, a transmission line medium having one or more impedance anomalies may introduce signal reflections. Thus, a transmitted signal will propagate over the medium and be partially reflected by one or more such anomalies, with such reflections appearing at the receiver at a later time in superposition with signals propagating directly.

One method of data-dependent receive equalization is Decision Feedback Equalization or DFE. Here, the time-domain oriented equalization is performed by maintaining a history of previously-received data values at the receiver, which are processed by a transmission line model to predict the expected influence that each of the historical data values would have on the present receive signal. Such a transmission line model may be precalculated, derived by measurement, or generated heuristically, and may encompass the effects of one or more than one previous data interval. The predicted influence of these one or more previous data intervals is collectively called the DFE compensation. At low to moderate data rates, the DFE compensation may be calculated in time to be applied before the next data sample is detected, as example by being explicitly subtracted from the received data signal prior to receive sampling, or implicitly subtracted by modifying the reference level to which the received data signal is compared in the receive data sampler or comparator. However, at higher data rates the detection of previous data bits and computation of the DFE compensation may not be complete in time for the next data sample, requiring use of so-called "unrolled" DFE computations performed on speculative or potential data values rather than known previous data values. As one example, an unrolled DFE stage may predict two different compensation values depending on whether the determining data bit will resolve to a one or a zero, with the receive detector performing sampling or slicing operations based on each of those predictions, the multiple results being maintained until the DFE decision is resolved.

BRIEF DESCRIPTION

Methods and systems are described for generating two comparator outputs by comparing a received signal to a first threshold and a second threshold according to a sampling clock, the first and second thresholds determined by an estimated amount of inter-symbol interference on a multi-wire bus, selecting one of the two comparator outputs as a data decision, the selection based on at least one prior data decision, and selecting one of the two comparator outputs as a phase-error indication, the phase error indication selected in response to identification of a predetermined data decision pattern.

DETAILED DESCRIPTION

Figure 1:
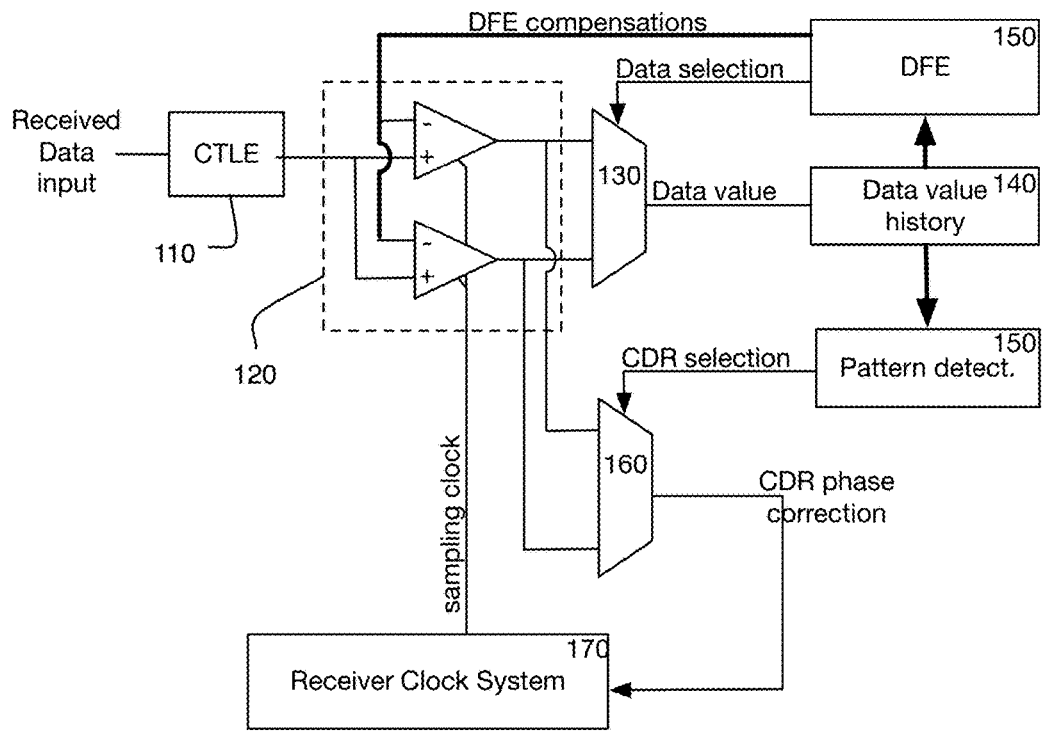
FIG. 1 is a block diagram of a receiver, in accordance with some embodiments.

In recent years, the signaling rate of high speed communications systems have reached speeds of tens of gigabits per second, with individual data unit intervals measured in picoseconds. One example of such a system is given by [Shokrollahi].

Conventional practice for a high-speed integrated circuit receiver have each data line to terminate (after any relevant front end processing such as amplification and frequency equalization) in a sampling device. This sampling device performs a measurement constrained in both time and amplitude dimensions; in one example embodiment, it may be composed of a sample-and-hold circuit that constrains the time interval being measured, followed by a threshold detector or digital comparator that determines whether the signal within that interval falls above or below (or in some embodiments, within bounds set by) a reference value. Alternatively, a digital comparator may determine the signal amplitude followed by a clocked digital flip-flop capturing the result at a selected time. In other embodiments, a combined time- and amplitude-sampling circuit is used, sampling the amplitude state of its input in response to a clock transition.

Subsequently, this document will use the term sampling device, or more simply "sampler" to describe this receiver component that generates the input measurement, as it implies both the time and amplitude measurement constraints, rather than the equivalent but less descriptive term "slicer" also used in the art. The well-known receiver "eye plot" graphically illustrates input signal values that will or will not provide accurate and reliable detected results from such measurement, and thus the allowable boundaries of the time- and amplitude-measurement windows imposed on the sampler.

Clock Data Recovery

So-called Clock Data Recovery or CDR circuits as in [Simpson] support such sampling measurements by extracting timing information, either from the data lines themselves or from dedicated clock signal inputs, and utilizing that extracted information to generate clock signals to control the time interval used by the data line sampling device(s). The actual clock extraction may be performed using well known circuits such as a Phase Locked Loop (PLL) or Delay Locked Loop (DLL), which in their operation may also generate higher frequency internal clocks, multiple clock phases, etc. in support of receiver operation.

As there may be unavoidable timing skews between signal lines and the recovered clock, it is common practice to incorporate secondary data line sampling circuits which may be intentionally offset by controlled amounts of time and/or amplitude, so as to determine the received data eye edges and thus discern whether the data sample timing or threshold level is optimally configured. One example of such art is given by [Loh]. Unfortunately, the addition of such secondary sampling circuits to multiple high-speed data inputs corresponds to a significant increase in integrated circuit real estate, and well as producing a substantial increase in power consumption.

Figure 6:
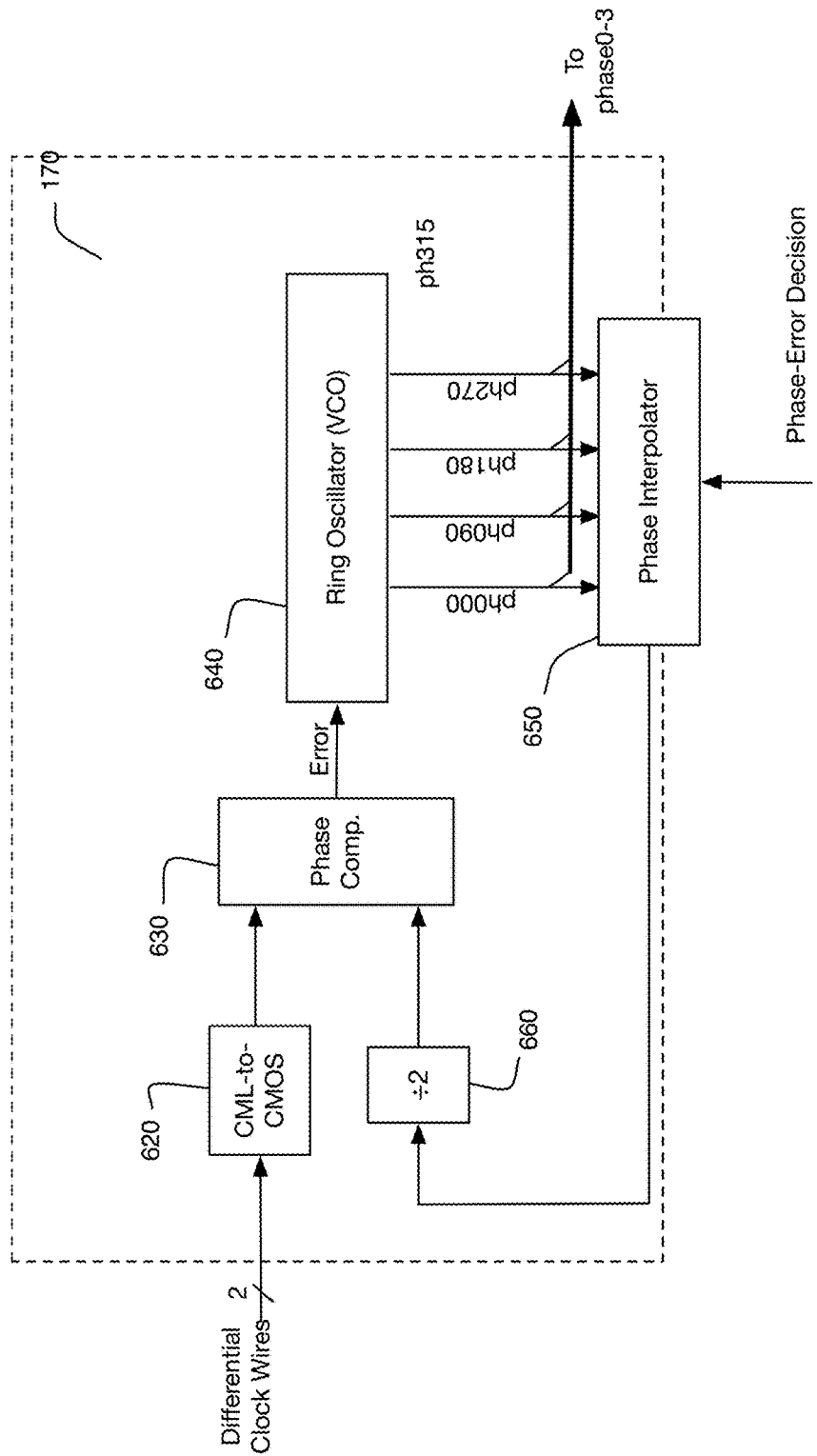
FIG. 6 is a block diagram of a receiver clock system, in accordance with some embodiments.

FIG. 6 illustrates an exemplary receiver clock system 170, which may be a modified version of the clock recovery system as described in [Simpson]. As shown, FIG. 6 includes a ring oscillator, which may be a voltage controlled oscillator (VCO), the ring oscillator configured to generate multiple phases of a sampling clock signal, one of which may be the sampling clock shown in FIG. 1. A phase interpolator 650 may receive the sampling clock phases from the VCO 640, and may generate an interpolated signal to provide to phase comparator 630. As shown, a frequency of the interpolated signal may be divided by some factor 660 prior to entering the phase comparator. The phase comparator may further receive a clock signal transmitted on the bus via differential clock wires, and generate an error signal to adjust the VCO 640. In the embodiment of FIG. 6, phase interpolator 650 may receive a phase-error indication signal corresponding to an early/late logic indication from one of the comparators 120 via the phase-error indication selection circuit 160, and may adjust an offset in the phase interpolator 650 based on the phase-error indication signal, which will in turn adjust a phase of the VCO 640 generating the sampling clocks.

Decision Feedback Equalization

It has become common practice for data communications receivers to incorporate Decision Feedback Equalization (DFE) to compensate for signal propagation anomalies in the communications medium. The DFE system performs time-domain oriented equalization on the received signal by maintaining a history of previously-received data values at the receiver, and processing those historic data values with a transmission line model to predict the expected influence each of the historical data values would have on the present receive signal. Such a transmission line model may be pre-calculated, derived by measurement, or generated heuristically, and may encompass the effects of one or more than one previous data interval. The predicted influence of these one or more previous data intervals is collectively called the DFE compensation, which is subsequently applied to the received signal to facilitate the current unit interval's detection. For purposes of explanation, this computation may be simply described as comprising multiplication of each previous unit interval's data value by a predetermined scaling factor, and then summation of each of these scaled results representing the effects of successive previous unit intervals to produce a composite DFE compensation value representing the cumulative predicted effect of all such previous unit intervals.

In a typical receiver design, this DFE compensation value will be subtracted from the current receive signal input, to produce a corrected signal more accurately representing the received data value. Such subtraction may be performed, as one example, by applying the received signal and the DFE compensation value to the inputs of a differential amplification circuit. In one common embodiment, this differential circuit represents the input of a digital comparator or a combined time- and amplitude-sampler, the output of which represents the detected data value relative to a particular threshold signal level.

Those familiar with the art will recognize that the DFE compensation value produced as described above cannot be calculated until the previous unit interval's data value has been detected. Thus, as data rates increase, a point will be reached at which the information to produce the DFE compensation value is not available in time to be applied to the next unit interval sampling. Indeed, at the highest data rates currently used in practice, this situation may exist for multiple previous unit intervals, as the detection time for a single data value may represent multiple unit interval durations, requiring the receiver to pipeline or parallelize the detection operation. Thus, it is common for embodiments to forgo such "closed loop" DFE methods for one or more of the most recent unit intervals, instead relying on an "open loop" or "unrolled loop" generation of one or more elements of the DFE compensation value for these most recent unit intervals.

In an effort to accelerate such DFE operation, some embodiments speculatively produce DFE compensation values corresponding to each of the possible detected data values for a given unit interval. In one example embodiment of this type, pairs of DFE compensation values are produced for three consecutive unit intervals corresponding to their possible binary data values, thus resulting in eight possible combined DFE compensation values for these three preceding unit intervals.

At least one embodiment extends this DFE unrolling behavior by incorporating multiple data detection samplers; each sampler provided with a distinct value of DFE compensation associated with the possible detected data value for one or more previous unit intervals. In such an embodiment, selection of which of the speculative DFE compensation values should be used may be postponed until after the current unit interval data detection, by storing the results of the various comparator outputs (which are dependent on different speculative DFE compensation values) and then later selecting which stored output is to be used for data detection. Although this late-decision DFE approach provides a significant increase in the amount of time available for data detection, it has an impact on receiver complexity. Moreover, the power utilization associated with the multiple samplers operating at high speeds may significantly increase receiver power use.

The set of DFE compensation values speculatively created to represent the constellation of potential detected data results over the previous transmit unit interval or intervals represent a set of measurement levels spanning some portion of the receive signal amplitude range. As an example, previous transmission of consecutive "zero" signals might lead to a predicted lower threshold level for a subsequent receiver data measurement incorporating speculative DFE compensation, while previous transmission of consecutive "one" signals might lead to a predicted higher threshold level for the same data measurement. Thus, for any data measurement used to detect an actual data value, the described multiple-sampler receiver will potentially perform measurement operations using thresholds either too high or too low for the actual signal during that interval. In some embodiments, these measurement operations from the samplers or comparators performing such speculative operations not directly associated with the actual data detection, although not used for determining the received data value, may nonetheless be used to obtain new information relating to clock recovery, thus mitigating the additional receiver power and complexity those devices add to the receiver.

Example Embodiment

For purposes of description and without implying limitation, a simple serial data receiver as shown in FIG. 1 will be used as an example. This example receiver includes at least one stage of speculative DFE 150 supported by two data samplers performing concurrent time-sampling operations at two different amplitude thresholds, and a receiver clock system 170 to produce a sampling clock, the phase of which may be adjusted by a CDR correction to optimize data sampling timing. As shown, the data samplers include comparators 120 generating comparator output slicing the signal received from CTLE 110 and sampling the comparator output according to the sampling clock.

In some embodiments, an apparatus includes two comparators 120 configured to generate two comparator outputs, the two comparators configured to compare a received signal to a first threshold and a second threshold according to a sampling clock, the first and second thresholds determined by an estimated amount of inter-symbol interference on a multi-wire bus. The apparatus may further include a data decision selection circuit 130 configured to select one of the two comparator outputs as a data decision, the selection based on at least one prior data decision that may be stored in data value history 140. The apparatus further includes a phase-error indication selection circuit 160 configured to select one of the two comparator outputs as a phase-error indication in response to receiving a CDR selection signal from a pattern detection circuit 150 configured to identify a predetermined data decision pattern in the data value history storage 140.

In some embodiments, the apparatus further includes a receiver clock system 170 configured to receive the phase-error indication and to responsively adjust a phase of the sampling clock. In some embodiments, the phase-error indication is an early/late logic decision on a transition of the received signal. In some embodiments, the data decision selection circuit 130 and phase-error indication circuit 160 select different comparator outputs.

In some embodiments, the apparatus further includes a decision-feedback equalization (DFE) circuit 150 configured to generate the first and second thresholds.

In some embodiments, the apparatus further includes a sub-channel detection multi-input comparator (MIC, not shown) operating on signals received via a plurality of wires, the sub-channel detection MIC configured to generate the received data input signal. In such embodiments, the signals received via the plurality of wires correspond to symbols of a codeword of a vector signaling code, the codeword corresponding to a weighted summation of a plurality of sub-channel vectors, each sub-channel vector mutually orthogonal. In such an embodiment, the inter-symbol interference is sub-channel specific, the sub-channel specific ISI corresponding to modulation of components of a corresponding sub-channel vector associated with the received signal. In some embodiments, sub-channel specific ISI associated with each sub-channel vector is mutually orthogonal. In some embodiments, the apparatus may further include a filter configured to filter the received signal prior to generating the comparator outputs.

Figure 2A:
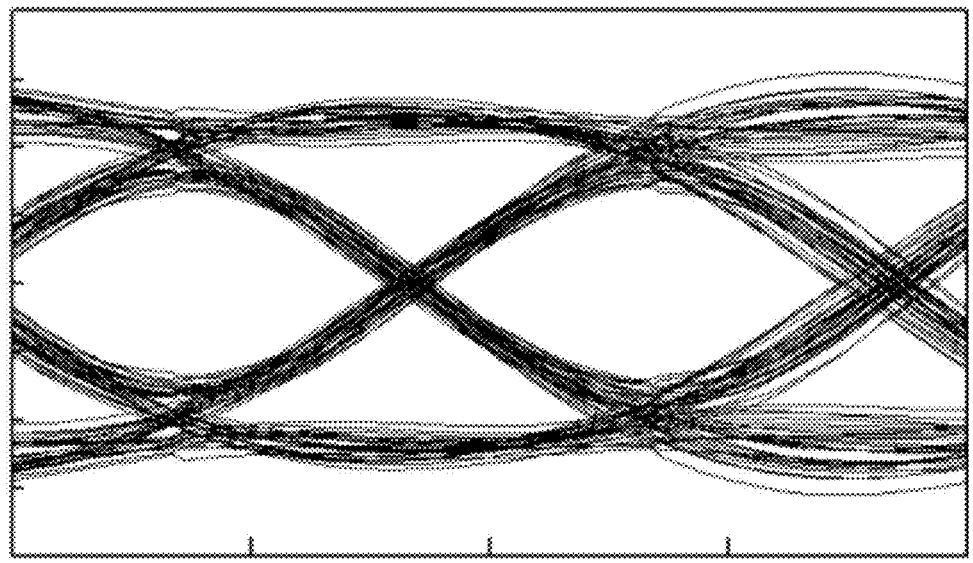
FIGS. 2A and 2B shows an example receive signal as an eye diagram.

FIG. 2A is an example of a typical receive signal "eye", produced by a time-overlay of the receive signal over multiple unit intervals. Thus, each individual line comprising the eye represents the receive signal "trajectory", as it passes from one unit interval to the next.

Figure 2B:
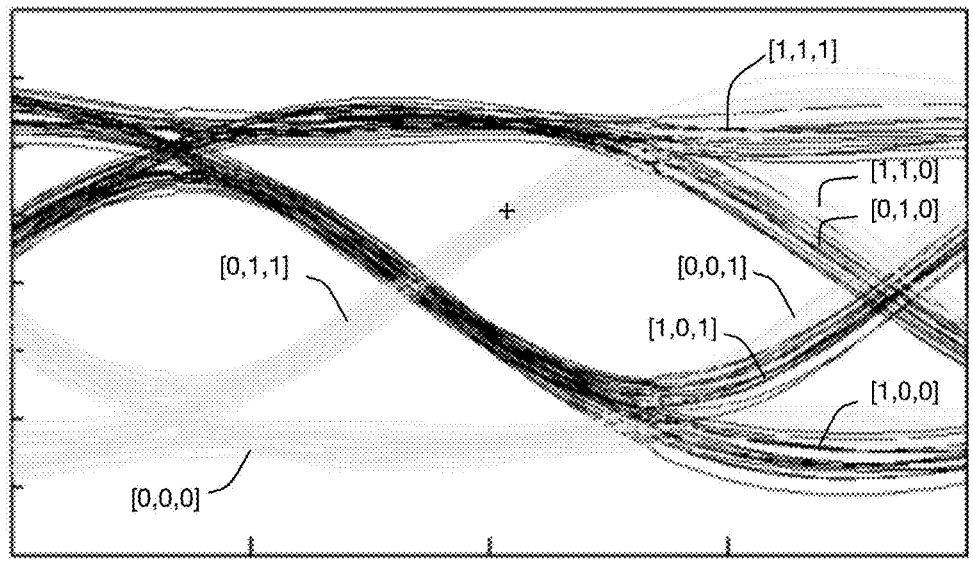

In FIG. 2B, subsets of signal trajectories comprising the eye of FIG. 2A are labeled using a triplet notation of [previous data value, current data value, subsequent data value]. As would be expected, the [1, 1, 1] trajectories are clustered along the top of the graph, the [1, 1, 0] trajectories transition downward at the right of the graph, [1, 0, 1] transition upward at the right of the graph, etc. Trajectories corresponding to a previous received data value of "1" (thus, optimally detected by the upper DFE sampling location) are shown as bold lines, while those trajectories corresponding to a previous received data value of "0" (and thus optimally detected by the lower DFE sampling location) are shown as pale lines.

The upper DFE sampler location selected by a DFE system to detect the current data value if the previous data value was "1" is shown with the symbol +. It may be noted that this sampler location is well positioned in the center of the upper data eye, but also is directly over the trajectory of a [0,1,1] and [0, 1, 0] received signal (the current data value of which will be detected by the lower sampler location, as determined by the previous data value of "0".) Thus, this + sampler result, unneeded for data detection of the [0,1,1] signal, may be utilized by the CDR system to determine whether the sampler timing is early or late relative to that signal transition.

In some embodiments, the signals shown in FIGS. 2A and 2B correspond to outputs of a sub-channel detection multi-input comparator (MIC) that is configured to receive a plurality of symbols of a codeword, and to detect modulations of a corresponding sub-channel vector of a plurality of sub-channel vectors, each sub-channel vector being mutually orthogonal. The codeword corresponds to a summation of the plurality of sub-channel vectors, and each sub-channel vector may be individually modulated by a corresponding information bit receive at an encoder generating the codeword. In such embodiments, the ISI seen in FIGS. 2A and 2B are sub-channel specific in that the ISI seen by the modulation of the corresponding sub-channel vector is only seen at the corresponding MIC. Thus, in a system with at least two sub-channel detection MICS, the ISI due to modulation of a first sub-channel vector is not felt at a second MIC for detecting a second sub-channel vector because the first and second sub-channel vectors are orthogonal.

Optimizing the Signal Waveform

Figure 3A:
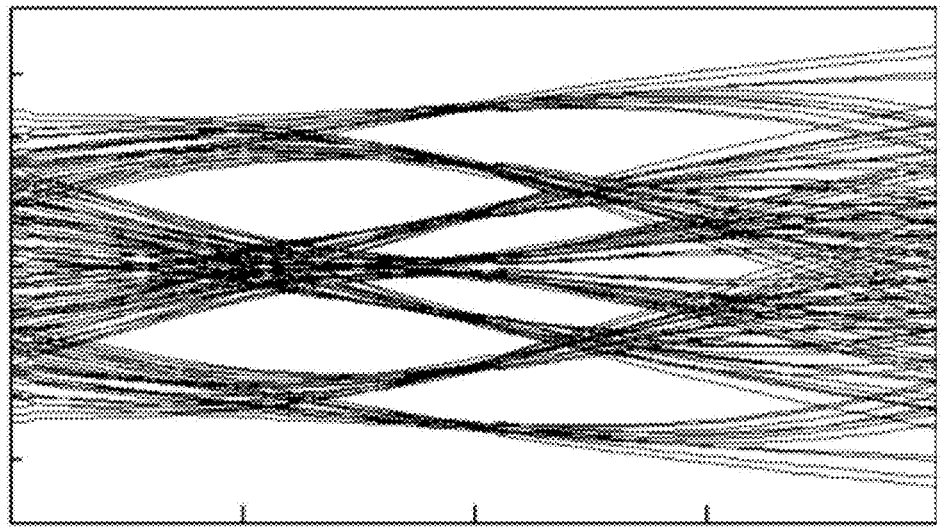
FIGS. 3A and 3B shows an example low pass filtered receive signal waveform as an eye diagram.
Figure 3B:
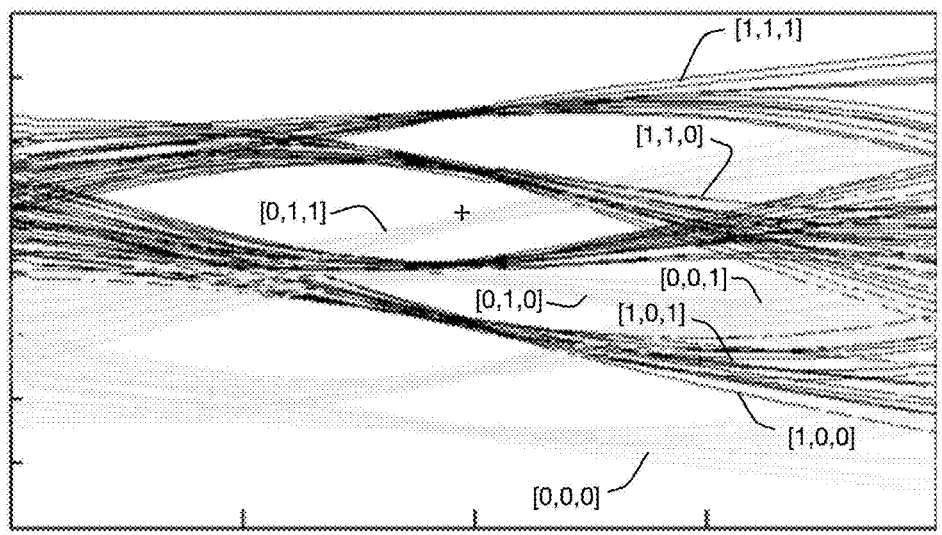

FIG. 3A shows the same signal eye as FIG. 2A but with additional low-pass filtering of the received data signal, in one example by appropriate configuration of a Continuous Time Linear Equalizer (CTLE) element in the signal path. In FIG. 3B, subsets of signal trajectories comprising the "eye" of FIG. 3A are labeled using the same triplet notation previously described, with trajectories corresponding to a current received data value of "1" are shown in bold lines, while those trajectories corresponding to a current received data value of "0" are shown as pale lines. The sampler location selected by a DFE system to detect the current data value if the previous data value was "1" is again shown with the symbol +.

It may be seen in FIG. 3B that such frequency-dependent filtration slightly reduces the vertical eye opening for data sampling, while significantly increasing the probability that the desirable [0, 1, 1] edge trajectories intersect the sampling point. Thus, rather than prior art CDR embodiments which introduce another sampling point at a time and amplitude measurement point chosen to intersect an edge, the present embodiment modifies the received signal using frequency-dependent filtering such that a resulting signal edge intersects an existing sampling point.

Figure 4:
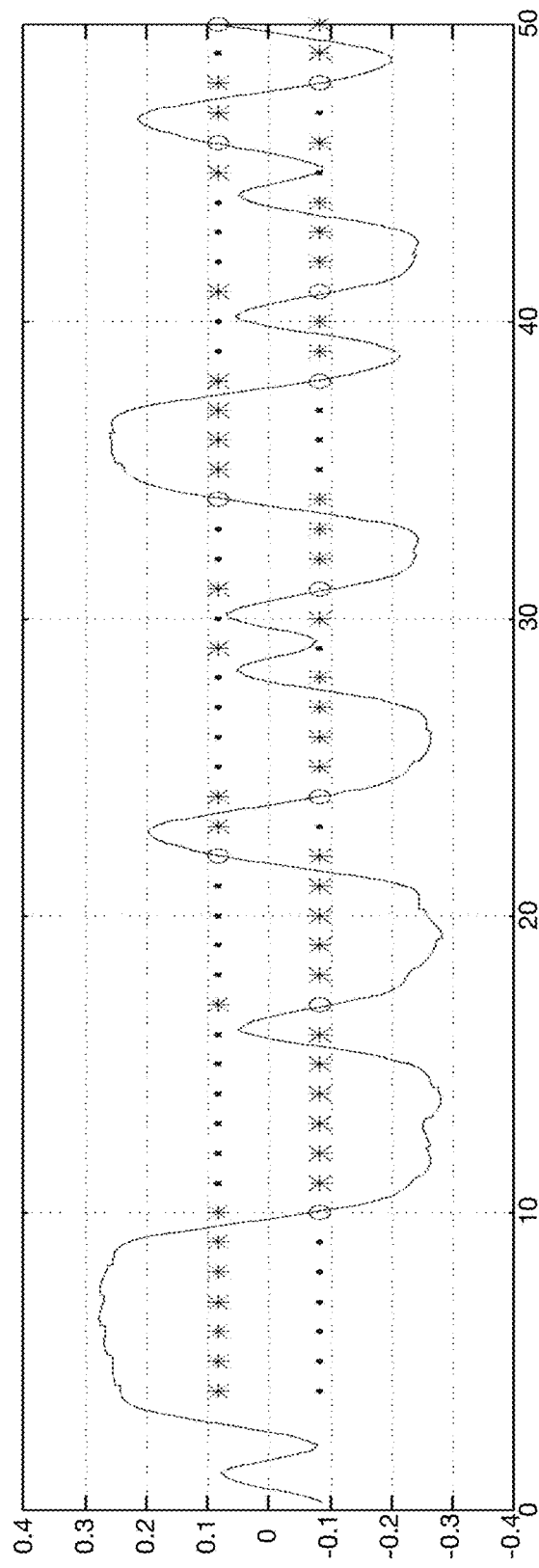
FIG. 4 is a graph of an example receive signal waveform annotated with representative sampling locations.

Continuing this example, FIG. 4 is a graph of a representative received signal waveform over 50 unit intervals, spanning an amplitude range from +0.28 to −0.28. Example thresholds as speculatively obtained from DFE are shown at +0.08 and −0.08, representing threshold values set for the two data samplers.

The useful data sampler results are graphically annotated using the symbols ✕, ○, and •, with ✕ representing a data sampler result used to obtain a data value, and • representing an unneeded data sampler result which may be ignored (i.e. the DFE predicted compensation value not corresponding to the actual data value subsequently detected. It may easily be observed that in this example the DFE system may steer selection of the current unit interval's data sampler result based on the state of the previous unit interval data value, with the current unit interval's result obtained from the upper sampler if the previous unit interval data was "1", and from the lower sampler if the previous unit interval data was "0".

The sampler results illustrated by the symbol ○ represent the interesting case where the "unneeded" result is obtained at a signal amplitude and time during which the input signal is transitioning, i.e. a signal edge. The CDR system can use these results to determine whether the sampling clock it generates is early (thus, capturing the state of the input signal before its expected transition) or late (similarly, capturing the state of the input signal after its expected transition) and as a result make an appropriate clock phase adjustment.

Unlike known CDR systems such as [Loh I], the same samplers are used for data detection and clock edge detection. Also differing from known art, clock and data sampling are performed using the same sampler clock timing, rather than requiring use of an offset edge-sampling clock for edge detection and an eye-center clock for data detection.

Further examination of FIG. 4 shows that in this example the sampler results useful for CDR may be identified by the triplet of [last data, current data, next data] results, with the result triplet [1, 0, 0] indicating timing information from the low slicer, and [0, 1, 1] indicating timing information from the high slicer. Identification of such sequences is facilitated by the historical data values typically maintained in embodiments such as considered herein, both as input to the DFE computation, and as an inevitable artifact of the pipelined or parallelized receive process typically used at the high data rates under consideration.

Thus, returning to the example embodiment of FIG. 1, data samplers 120 capture the state of the received data input at a time determined by sampling clock generated by receiver clock system 170 and at different thresholds determined by DFE compensation values produced by DFE system 150 based on data value history 140. In some embodiments, an open-loop or unrolled DFE embodiment may produce predictive compensation values used to sample a received signal, and subsequently select 130 one sampled result to obtain a data value. The series of data values so obtained are stored in a data value history 140 for use in the described computations.

As previously described, the sampled result not selected to obtain a data value may under some conditions be used to observe a received data input transition. Pattern detection circuit 150 is triggered when those conditions are found in the sequence of data values stored in data value history 140, selecting a sampled data value using a phase-error indication selection circuit to be used as a CDR phase correction to receiver clock system 170. Shaping of the analog signal characteristics of the received data input being sampled maximizes the opportunities to utilize the sampled results for clock phase correction. The frequency-dependent filtering provided by CTLE 110 provides the necessary signal shaping in this example.

Figure 5:
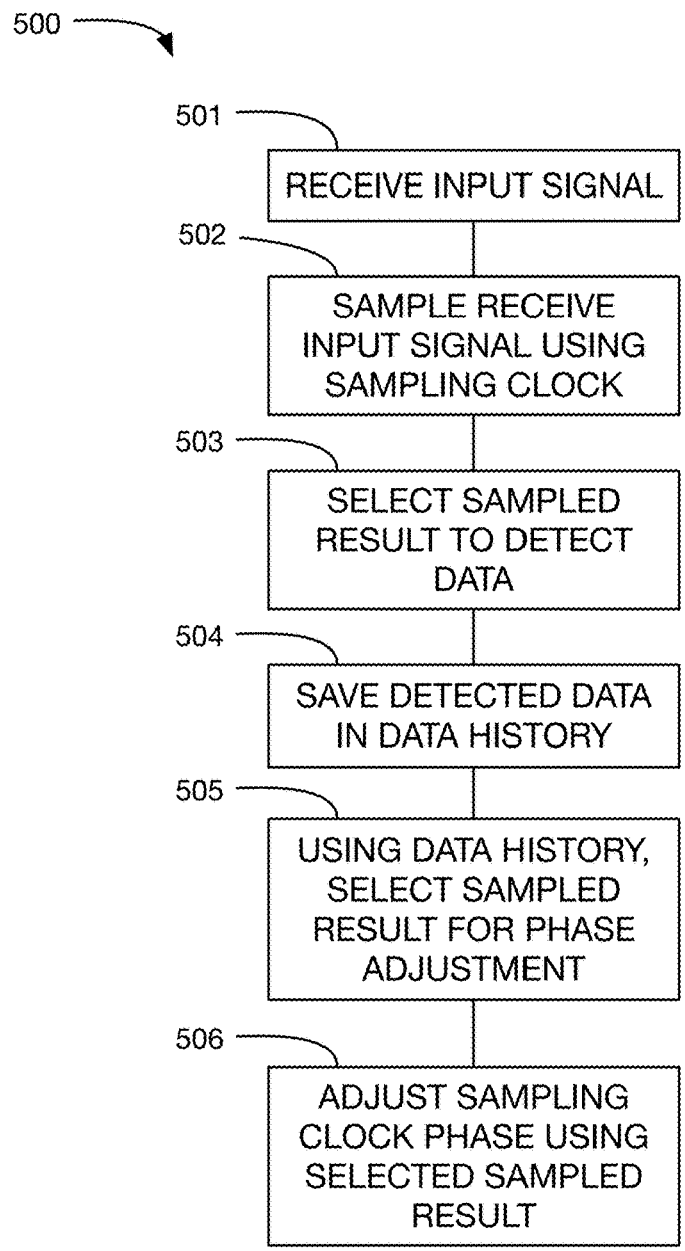
FIG. 5 is a flowchart of a method, in accordance with some embodiments.

FIG. 5 illustrates the operation of an embodiment as an operational sequence or process 500. One or more input signals are received 501 and are sampled 502 at two or more distinct amplitudes at a single time determined by the sampling clock. One such sampled result is selected 503 as the detected data value, which is then saved in a data history 504. Based on two or more saved data history values, a sampled result not selected as the detected data value is selected 505 and used to adjust the sampling clock phase 506 used for subsequent sampling. Similarly, the distinct amplitudes at which subsequent sampling is performed may be adjusted based on two or more saved data history values.

Figure 7:
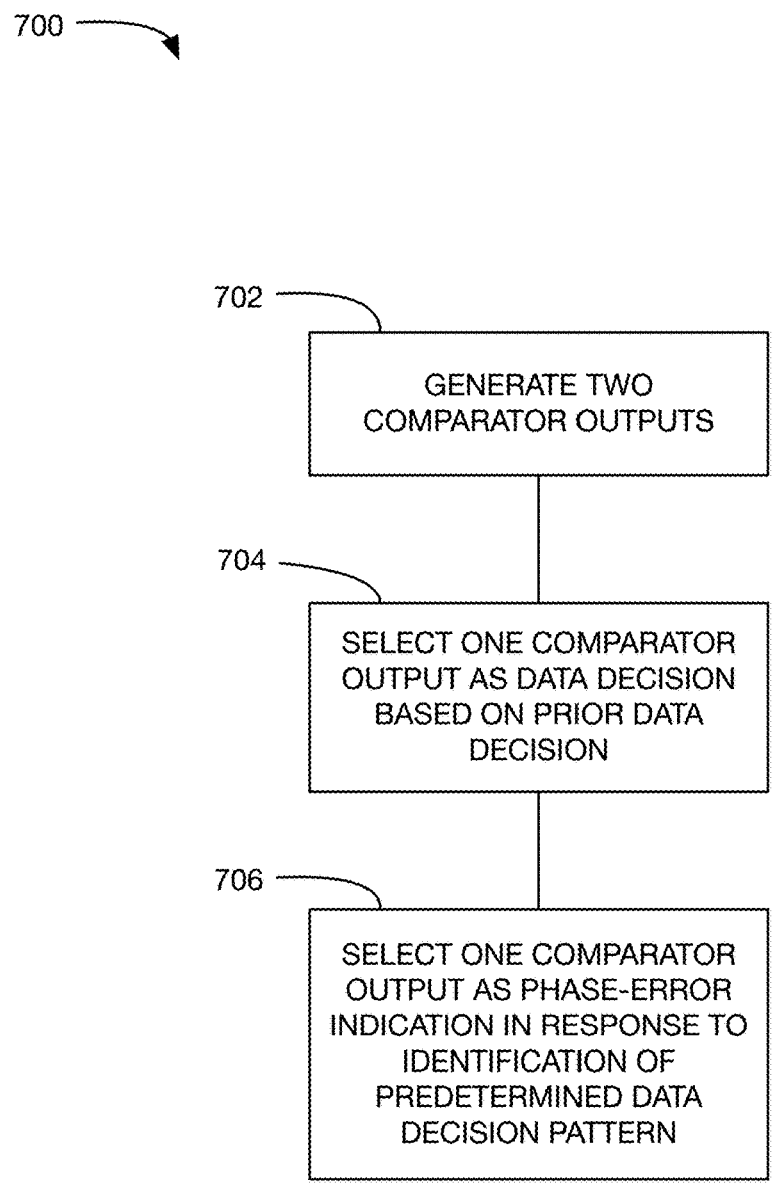
FIG. 7 is a flowchart of a method, in accordance with some embodiments.

FIG. 7 illustrates a flowchart of a method 700, in accordance with some embodiments. As shown, method 700 includes generating 702 two comparator outputs by comparing a received signal to a first threshold and a second threshold according to a sampling clock, the first and second thresholds determined by an estimated amount of inter-symbol interference on a multi-wire bus, selecting 704 one of the two comparator outputs as a data decision, the selection based on at least one prior data decision, and selecting 706 one of the two comparator outputs as a phase-error indication, the phase error indication selected in response to identification of a predetermined data decision pattern.

In some embodiments, the method further includes adjusting a phase of the sampling clock according to the phase-error indication. In some embodiments, the phase-error indication is an early/late logic decision on a transition of the received signal. In some embodiments, the data decision and phase-error indication correspond to different comparator outputs. In some embodiments, the method further includes generating the first and second thresholds using a decision-feedback equalization (DFE) circuit 150.

In some embodiments, the method further includes generating the received signal using a sub-channel detection multi-input comparator (MIC) operating on signals received via a plurality of wires. In some embodiments, the signals received via the plurality of wires correspond to symbols of a codeword of a vector signaling code, the codeword corresponding to a weighted summation of a plurality of sub-channel vectors, each sub-channel vector mutually orthogonal. In some embodiments, the inter-symbol interference is sub-channel specific, the sub-channel specific ISI corresponding to modulation of components of a corresponding sub-channel vector associated with the received signal. In some embodiments, sub-channel specific ISI associated with each sub-channel vector is mutually orthogonal. In some embodiments, the method further includes filtering the received signal prior to generating the comparator outputs.

As described in [Shokrollahi], an exemplary encoding scheme for above-described codewords is given below:

Each codeword may be generated by multiplying a row vector of information bits S by an orthogonal matrix A:

$$S \cdot A = w$$

$$\text{where } A = \begin{bmatrix} 1 & 1 & 1 & 1 & 1 & 1 \\ 1 & -1 & 0 & 0 & 0 & 0 \\ 1 & 1 & -2 & 0 & 0 & 0 \\ 0 & 0 & 0 & 1 & -1 & 0 \\ 0 & 0 & 0 & 1 & 1 & -2 \\ 1 & 1 & 1 & -1 & -1 & -1 \end{bmatrix}$$

and S=a row vector of information bits $[0, S_0, S_1, S_2, S_3, S_4]$ representing antipodal weights (e.g., ±1 for logic bits 0, 1, or alternatively ±⅓), and w is the codeword vector of symbols to be transmitted $[w_0, w_1, w_2, w_3, w_4, w_5]$. As shown, each row in matrix A corresponds to a sub-channel vector, and each sub-channel vector is (i) mutually orthogonal and (ii) orthogonal to the common-mode row of all ones. In such embodiments, the common-mode row of all 1's may be unused, and rows 2-6 are each modulated by a corresponding information bit $S_0$-$S_4$ to transmit 5 bits over 6 wires.

DFE embodiments are known that perform more complex analysis based on a larger history of previous data values to determine the correct sampler result, so such embodiments may similarly utilize more complex historical data value sequences when selecting sampler results useful for CDR adjustment, thus no limitation should be inferred from the simplified descriptive examples herein. Similarly, embodiments incorporating differently configured signal filtration (i.e. producing as a result different delay relationships for different signal trajectories and sampling point locations) may utilize different historical data value sequences when selecting such desirable sampler results. It may also be noted that the naming of the data value triplets as [last data, current data, next data] is arbitrary and chosen for descriptive simplicity, with no limitation implied; in an embodiment which maintains a historical record of received data values as described herein, such a sequence may be equally well comprised of any set of sequential historical values, such as [historically penultimate data value, historically last data value, current data value], etc. Indeed, in at least one embodiment, the sequence of data values used in sampler selection, the stored sampler value selected for data detection, and the stored sampler value selected as relevant to updating of the CDR phase, all represent receive unit intervals previous to the present time.

We claim:

1. A method comprising:
    generating a received signal using a sub-channel detection multi-input comparator (MIC) operating on signals received via a plurality of wires, the signals received via the plurality of wires correspond to symbols of a codeword of a vector signaling code, the codeword corresponding to a weighted summation of a plurality of sub-channel vectors, each sub-channel vector mutually orthogonal;
    generating two comparator outputs at a single sampling point by comparing the received signal to a first threshold and a second threshold according to a sampling clock, the first and second thresholds associated with sub-channel specific inter-symbol interference on a multi-wire bus;
    selecting one of the two comparator outputs as a data decision, the selection based on at least one prior data decision; and
    selecting one of the two comparator outputs as a phase-error indication to be provided to a clock recovery circuit generating the sampling clock in response to an identification of a predetermined data decision pattern.

2. The method of claim 1, further comprising adjusting a phase of the sampling clock according to the phase-error indication.

3. The method of claim 2, wherein the phase-error indication is an early/late logic decision on a transition of the received signal.

4. The method of claim 1, further comprising generating the first and second thresholds using a decision-feedback equalization (DFE) circuit.

5. The method of claim 4, wherein the first and second thresholds correspond to speculative DFE thresholds.

6. The method of claim 1, wherein the sub-channel specific ISI corresponds to modulation of components of a corresponding sub-channel vector associated with the received signal.

7. The method of claim 6, wherein sub-channel specific ISI associated with each sub-channel vector is mutually orthogonal.

8. The method of claim 1, further comprising filtering the received signal prior to generating the two comparator outputs.

9. An apparatus comprising:
    a sub-channel detection multi-input comparator (MIC) operating on signals received via a plurality of wires, the sub-channel detection MIC configured to generate a received signal, wherein the signals received via the plurality of wires correspond to symbols of a codeword of a vector signaling code, the codeword corresponding to a weighted summation of a plurality of sub-channel vectors, each sub-channel vector mutually orthogonal;

two comparators configured to generate two comparator outputs at a single sampling time, the two comparators configured to compare the received signal to a first threshold and a second threshold according to a sampling clock, the first and second thresholds associated with sub-channel specific inter-symbol interference on a multi-wire bus;

a data decision selection circuit configured to select one of the two comparator outputs as a data decision, the selection based on at least one prior data decision; and a phase-error indication selection circuit configured to select one of the two comparator outputs in response to receiving a selection signal from a pattern detection circuit configured to identify a predetermined data decision pattern, and to responsively provide the selected comparator output to a clock recovery circuit as a phase-error indication.

10. The apparatus of claim 9, further comprising a receiver clock system configured to receive the phase-error indication and to responsively adjust a phase of the sampling clock.

11. The apparatus of claim 10, wherein the phase-error indication is an early/late logic decision on a transition of the received signal.

12. The apparatus of claim 9, further comprising a decision-feedback equalization (DFE) circuit configured to generate the first and second thresholds.

13. The apparatus of claim 12, wherein the first and second thresholds are speculative DFE thresholds.

14. The apparatus of claim 9, wherein the sub-channel specific ISI corresponds to modulation of components of a corresponding sub-channel vector associated with the received signal.

15. The apparatus of claim 14, wherein sub-channel specific ISI associated with each sub-channel vector is mutually orthogonal.

16. The apparatus of claim 9, further comprising a filter configured to filter the received signal prior to generating the two comparator outputs.

* * * * *